United States Patent [19]

Kasano et al.

[11] Patent Number: 4,943,937
[45] Date of Patent: Jul. 24, 1990

[54] APPARATUS FOR PROCESSING IMAGES HAVING DESIRED GRAY LEVELS INCLUDING A THREE-DIMENSIONAL FRAME MEMORY

[75] Inventors: Akira Kasano; Yoichi Inoue, both of Tokyo, Japan

[73] Assignee: Kabushiki Kaisha Toshiba, Kawasaki, Japan

[21] Appl. No.: 173,752

[22] Filed: Mar. 25, 1988

[30] Foreign Application Priority Data

Mar. 31, 1987 [JP] Japan .................................. 62-78590

[51] Int. Cl.$^5$ .......................................... G06F 15/20
[52] U.S. Cl. .................................... 364/521; 340/750; 340/799; 364/518
[58] Field of Search ....................... 364/518, 521, 522; 340/747, 750, 798–800; 382/18; 358/160, 180; 365/117, 220

[56] References Cited

U.S. PATENT DOCUMENTS

| | | | |
|---|---|---|---|
| 4,101,975 | 7/1978 | Brody | 365/117 |
| 4,563,703 | 1/1986 | Taylor et al. | 358/160 |
| 4,564,915 | 1/1986 | Evans et al. | 364/521 |
| 4,709,393 | 11/1987 | Taylor et al. | 358/180 X |
| 4,725,987 | 2/1988 | Cates | 364/518 X |
| 4,742,474 | 5/1988 | Knierim | 340/799 X |
| 4,745,407 | 5/1988 | Costello | 340/799 |
| 4,800,380 | 1/1989 | Lowenthal et al. | 340/799 X |

FOREIGN PATENT DOCUMENTS

| | | |
|---|---|---|
| 0073486 | 3/1983 | European Pat. Off. ............ 365/230 |
| 3309847 | 9/1983 | Fed. Rep. of Germany . |

OTHER PUBLICATIONS

German Patent Office Action and Translation Dated Dec. 9, 1988.
M. J. B. Duff, Special Hardware for Pattern Processing, IEEE Proceedings of the 6th International Conference on Pattern Recognition, Oct. 19-22, 1982, pp. 368-397.

*Primary Examiner*—Gary V. Harkcom
*Assistant Examiner*—H. R. Herndon
*Attorney, Agent, or Firm*—Finnegan, Henderson, Farabow, Garrett, and Dunner

[57] ABSTRACT

An image processing apparatus includes a 3-dimensional frame memory. The frame memory is made up of a plurality of memory planes which are logically stacked in a depth direction (Z direction) and are accessed independently. The apparatus also includes a memory controller which can access a plurality of memory areas of the frame memory. These memory areas can be located in any desired position in the depth direction, and can each have a desired number of bits in the depth direction, regardless of a bit length of image buses contained in the apparatus and connected to an image processor, and the memory controller. The image processor receives data through the image buses, logically operates the data and outputs it to the image buses. When in read mode, the memory controller converts the data read out from the memory areas of the frame memory into the type of data which can be transferred through the image buses. When in write mode, the memory controller converts the data received from the image buses into data which can be written into the memory areas.

12 Claims, 5 Drawing Sheets

APPARATUS FOR PROCESSING IMAGES HAVING DESIRED GRAY LEVELS INCLUDING A THREE-DIMEMSIOANL FRAME MEMORY

Background of the Invention

1. Field of the Invention

This invention relates to an apparatus for processing images in various ways by using image data stored in an image memory.

2. Description of the Related Art

A conventional image processing apparatus normally has a plurality of image memories. Each of these image memories includes a frame memory which stores graduation data representing the gray level of each of the picture elements (pixels) which constitute an image. In order to perform image processing, an image processor uses one of the image memories as a source memory, and another as a destination memory.

In the case of the conventional image processing apparatus, the number of bits which make up gray level data is determined by the data bit length of the image bus. Each frame memory stores gray level data of a fixed bit length. However, this type of image processing apparatus does not make efficient use of the memory space of the frame memory when an image having a desired gray level which can be expressed by a small number of bits, is processed. Specifically, let us consider a processed image which is a two-level image represented by 8-bit gray level data. Since the gray level of a two-level image can be expressed by merely one of the eight bits, this means that 7 bits of this image are not used and that therefore 7/8 of the memory space is, in effect, wasted.

Thus, in such cases, the memory space of the image memory of the conventional image processing apparatus is not used efficiently.

Summary of the Invention

Accordingly, an object of this invention is to provide an image processing apparatus which makes efficient use of the memory space available in an image memory, and can process an image having any desired gray level.

To achieve the above object, there is provided an image processing apparatus comprising three-dimensional frame memory means for storing image data, and comprising a plurality of memory planes logically stacked in the depth direction, memory control means connected to said frame memory means, for independently accessing a plurality of desired memory areas of said frame memory means, each of said desired memory areas existing in a desired position in the depth direction of said frame memory means and having a desired number of bits, a plurality of image bus means connected to said memory control means, for transferring image data, image processor means connected to said plurality of image bus means, for receiving the image data from at least one of said image bus means and logically operating the image data and for outputting the result of operation to at least one of the other image bus means, and control means connected to said memory control means and said image processor means, said control means designating, for said memory control means, access areas of said frame memory means, which is to be accessed by said memory control means, and the type of access for each access area, and said control means allocating said plurality of image bus means to said memory control means and said image processor means for each access area.

The memory space of the three-dimensional frame memory can be divided, in the depth direction, into a plurality of memory blocks each for storing a desired number of bits, regardless of the bit length of the image bus. The memory space can therefore be used efficiently, making it possible to process the image data of a desired bit length at a high speed.

Detailed Description of the Preferred Embodiment

An embodiment an image processing apparatus according to this invention will be described, with reference to FIGS. 1 to 4C.

Figure 1:
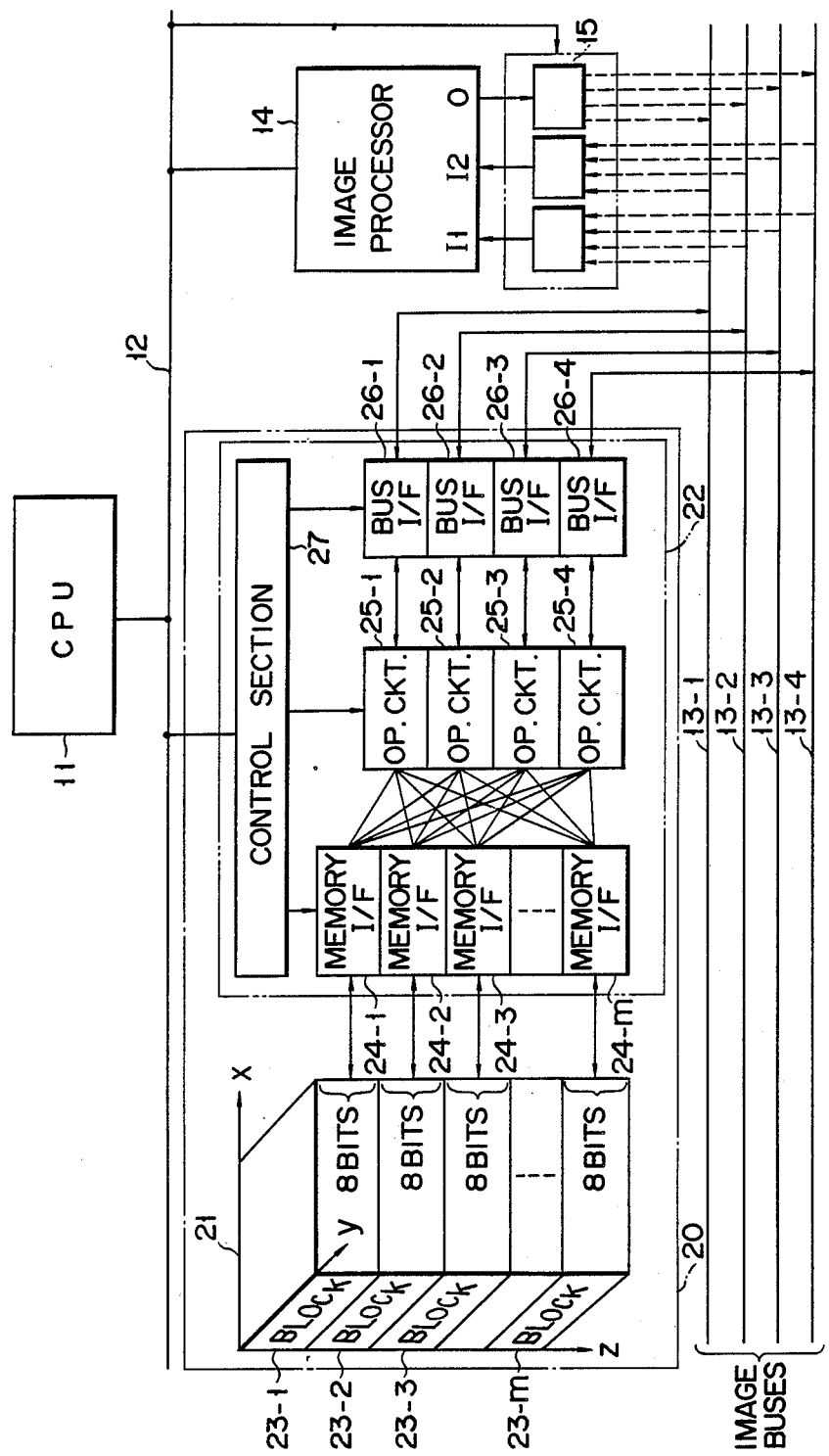
FIG. 1 is a block diagram showing an arrangement of an image processing apparatus according to an embodiment of this invention.

An arrangement of an image processing apparatus according to one embodiment of this invention is shown in FIG. 1. In the figure, CPU 11 controls the operation of the image processing apparatus. CPU 11 is connected to control bus 12. Control bus 12 transfers various types of data which is used by CPU 11 for controlling the related portions in the image processing apparatus.

Image buses 13-1 to 13-4 transfer image data. The data bit length of image buses 13-1 to 13-4 is 8 bits, for example. Image processor 14 is connected to control bus 12. In FIG. 1, a single image processor 14 is used, but two or more image processors can be used, if necessary. Image processor 14 has two input ports 11 and 12, and one output port O. Image bus controller 15 is connected to control bus 12, image processor 14, and image buses 13-1 to 13-4. Image bus controller 15 connects any of image buses 13-1 to 13-4 to the input port 11 of image processor 14, and another bus to input 12, and an additional bus to output port O. These image buses 13-1 to 13-4 are allocated to those ports under control of CPU 11. Image bus controller 15 switches these connections of the ports 11, 12 and O of image processor 14 to image buses 13-1 to 13-4, when necessary.

Image memory 20 is connected to control bus 12 and image buses 13-1 to 13-4. The instance of FIG. 1 uses a single image memory 20, but may use a plurality of image memories 20. Image memory 20 includes 3-dimensional frame memory 21 and memory controller 22 connected to frame memory 21, for controlling the same. Three-dimensional frame memory 21 has a memory area of 8×m bits (m is a positive integer), for example, in the depth direction (Z direction). Three-dimensional frame memory 21 is logically divided into memory blocks every given number of bits, in the depth direction. The number of bits is equal to the data bit length "r" of image buses 13-1 to 13-4. In this instance, 3-dimensional frame memory 21 is divided into "m" memory blocks every 8 bits, in the depth direction. Frame memory 21 may be considered as a stack of m 8-bit memory blocks.

Three-dimensional frame memory 21 is connected to memory controller 22 for controlling the memory 21 for each memory block. Memory controller 22 comprises memory interfaces (I/F) 24-1 to 24-m, arithmetic/logic units 25-1 to 25-4, bus interfaces 26-1 to 26-4, and control section 27. Memory I/Fs 24-1 to 24-m are provided for memory blocks 21-1 to 21-m, respectively.

Memory I/Fs 24-1 to 24-m are respectively connected to corresponding memory blocks 23-1 to 23-m, and make a read access and a write access to those blocks.

Operation circuits (arithmetic/logic units) 25-1 to 25-4 are provided for image buses 13-1 to 13-4, respectively. Each of which are connected to memory I/Fs 24-1 to 24-m. In a read mode, operation circuits 25-1 to 25-4 logically operate the data read from frame memory 21, and generate the data output to image buses 13-1 to 13-4. In a write mode, operation circuits 25-1 to 25-4 performs a logic operation on the data from image buses 13-1 to 13-m, thereby generating the data to be written into 3-dimensional frame memory 21. Bus I/Fs 26-1 to 26-4 are provided for image buses 13-1 to 13-4, respectively.

Bus I/Fs 26-1 to 26-4 are connected to buses 23-1 to 23-4, respectively, and to operation circuit 25-1 to 25-4, respectively. Bus I/Fs 26-1 to 26-4 transfer data between image buses 13-1 to 13-4, on the one hand, and operation circuits 25-1 to 25-4, on the other.

In accordance with the instructions supplied from CPU 11, control section 27 controls memory I/Fs 24-1 to 24-m, operation circuits 25-1 to 25-4, and bus I/Fs 26-1 to 26-4. More specifically, control section 27 selects one or some of memory I/Fs 24-1 to 24-m, sets up a read or write mode for the selected memory I/F, and specifies memory area to be accessed in three dimensional frame memory 21. Control section 27 supplies an instruction representing the flow direction of data to bus I/Fs 26-1 to 24-4. Memory controller 22 may consist of discrete parts. When CPU and its peripheral circuits are used for memory controller 22, the operation of this controller can be performed by software. When this image processing apparatus need not operate at high speed, CPU 11 can be used for the memory controller.

A ROM, for storing a program for CPU 11 operation and other fixed data, is connected to control bus 12. An interface (not shown) for controlling transfer of data between CPU 11 and external devices, such as a keyboard and a host computer, is connected to control bus 12.

Figure 2A:
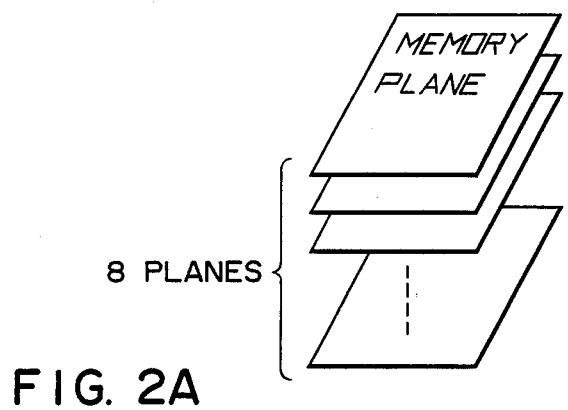
FIGS. 2A and 2B are schematic and block diagrams for explaining a memory block 23-i (i=1 to m) shown in FIG. 1.

One memory block 23-i (i=1, 2, ..., m) of 3-dimensional memory 21 will be described, with reference to FIGS. 2A and 2B. Memory block 23-i comprises 8 memory planes logically stacked in the depth direction. Each memory plane can store bits in a single X-Y plane, i.e., the bits corresponding to the pixels forming one frame. The each memory plane stores bits, each representing the gray level of one pixel.

Figure 2B:
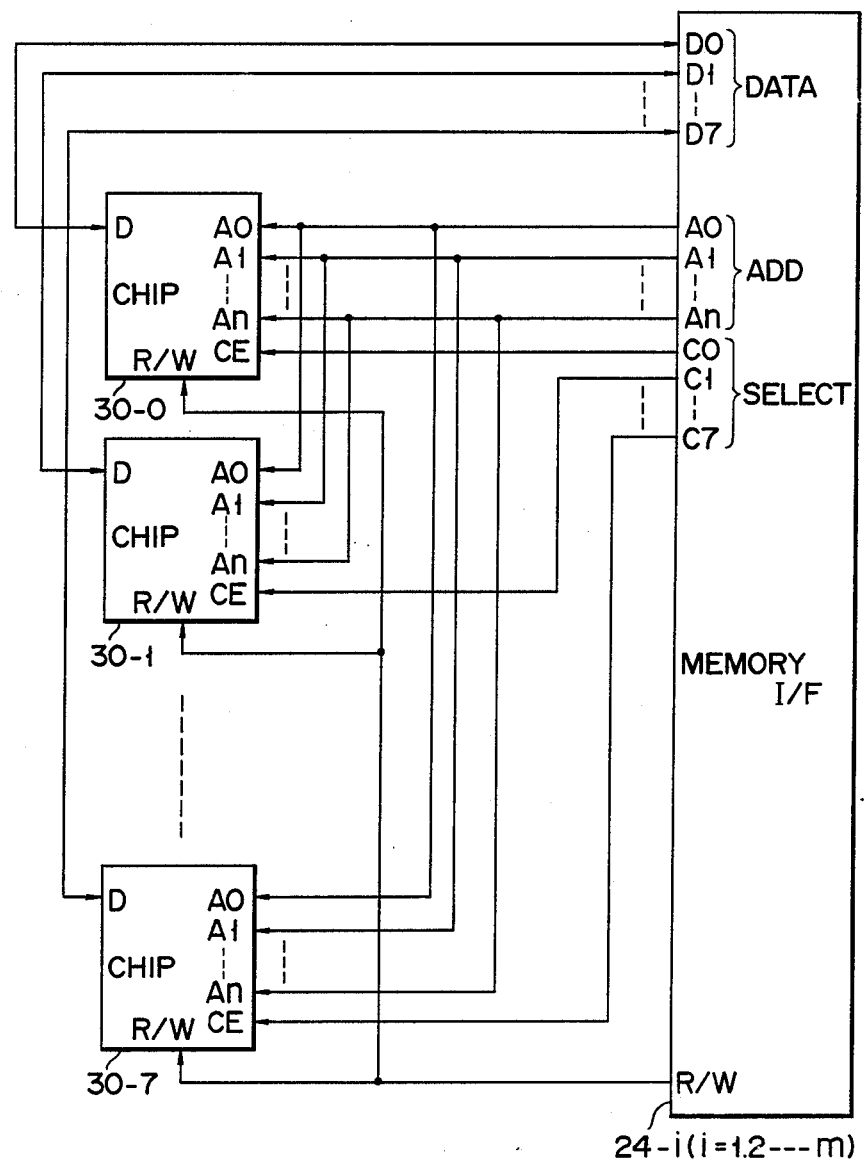

More specifically, memory block 23-i comprises 8 memory chips 30-0 to 30-7, as is shown in FIG. 2B. Memory chips 30-0 to 30-7 each store the bits, each representing the gray level of each pixel constituting one frame. Address terminals A0 to An of memory chips 30-0 to 30-7 are supplied with a common address derived from memory I/F 24-i (i=1, 2, ..., m). Chip enable terminals CE of memory chips 30-0 to 30-7 are supplied with chip select signals C0 to C7 derived from memory I/F 24-i. Memory I/F 24-i can select any of memory chips 30-0 to 30-7. The R/W terminals of memory chips 30-0 to 30-7 are supplied with a common R/W signal from memory I/F 24-i. Therefore, memory chips 30-1 to 30-7 are simultaneously set in a read mode or a write mode. The data terminals D of memory chips 30-0 to 30-7 are connected to the data terminals D0 to D7 of memory I/F 24-i.

The operation of the image processing apparatus thus arranged will be described. It will be first explained how memory controller 22 operates, and then how the entire apparatus operates.

In this embodiment, CPU 11 can designate the read mode and the write mode of frame memory 21 for each of image buses 13-1 to 13-4. CPU 11 designates an access to the data of "q" bit which starts at the p-th bit of three-dimensional frame memory 21 in the Z direction. Here, "p" is 0 to $(8 \times m - 1)$, and "q" is 1 to 8. For example, "q" indicates the number of bits forming the gray level data. The memory block 23-i to be accessed actually is the memory block, where i is an integer given by:

$$i = [p/8] + 1 \text{ to } [(p+1-1)] + 1$$

CPU 11 designates the memory block to be accessed (the top memory block when a plurality of memory blocks are accessed). The "p" indicates the position of the top bit of the top memory block, and is 0 to 7.

Memory controller 22 has the following four types of operations: A. Read operation for one memory block, B. Read operation for two memory blocks, C. Write operation for one memory block, and D. Write operation for two memory blocks. These operations A to D will be described when image bus 13-1 is used as a source bus or a destination bus.

A: Read Operation for One Memory Block

The data of "q" bit $(1 \leq q \leq 8)$ in the Z direction as counted from bit "p" $(0 \leq p \leq 7)$ is read out from memory block 23-i. Here, $1 \leq p + q \leq 8$.

(1) Upon receipt of an instruction from CPU 11, control section 27 determines that memory block 23-i must be accessed, and notifies memory I/F 24-i of a read access. Control section 27 notifies operation circuit 24-1 of the read access, and values of "p" and "q", and the like, and further notifies bus I/F 25-1 of the read access.

Memory I/F 24-i reads out 8 bits from memory block 23-i in a parallel manner. Memory I/F 24-1 outputs the read out data to operation circuit 25-1 corresponding to image bus 13-1.

(2) Operation circuit 25-1 shifts, by p bits, the 8-bit data as read out by memory I/F 24-i, toward the LSB. Operation circuit 25-1 sets the bits of the shifted data, which is "q+1" or a higher bit, at "0", and outputs it to bus I/F 26-1. When the data stored in memory block 23-i is (MSB)11011011(LSB), and P=2 and q=4, the operation circuit shifts the data by 2 bits, thereby generating "00110110", and writes "0" into the 4th bit and subsequent bits, and outputs "00000110".

(3) Bus I/F 26-1 outputs the 8-bit data from operation circuit 25-1 to image bus 13-1.

B: Read Operation for Two Memory Blocks
(Read operation from a memory area ranging two memory blocks)

The "q" bit $(1 \leq q \leq 8)$ starting at bit "p" $(1 \leq p \leq 7)$ of memory block 23-i is read out. Here $P + q \geq 8$. The (8-p) bit is read out from memory block 23-i, and the (P+q-8) bit is read out from the next memory block 23-(i+1).

(1) Upon receipt of an instruction supplied from CPU 11, control section 27 determines that memory blocks 23-i and 23-(i+1) must be accessed, and notifies memory I/Fs 24-i and 24-(i+1) of a read access. Control section 27 notifies operation circuit 24-1 of the read access, and the values of "p" and "1", and the like and notifies bus I/F 25-1 of the read access.

Memory I/Fs 24-i and 24-(i+1) read out 8 bits from memory blocks 23-i and 23-(i+1) and output them to operation circuit 25-1.

(2) Operation circuit 25-1 shifts, by p bits, the 8-bit data read from memory block 23-i toward the LSB, and sets the bits equal to or higher than bit (8-p) at "0". Operation circuit 25-1 shifts the 8-bit data, read out from memory block 23-(i+1), by (8-p) bit toward the MSB, and sets the bits equal to or lower than bit (7-p) and the bits equal to or higher than bit "q", at "0". Operation circuit 25-1 ORs the two data generated, and outputs it to bus I/F 26-1. When p=5, and q=6, and (MSB)10011001(LSB) is read out from memory block 23-i, and "10011001" is read out from memory block 23-(i+1), the operation circuit 25-1 generates "00000100" and "00001000" and ORs them, and output "00001100" to bus I/F 26-1.

(3) Bus I/F 26-1 outputs the 8-bit data from operation circuit 25-1 to image bus 13-1.

C: Write Operation for One Memory Block

The data is written into "q" bit ($1 \leq q \leq 8$) as counted from bit "p" ($0 \leq p \leq 7$) of memory block 23-i. Here, $1 \leq p+q \leq 8$.

(1) Upon receipt of an instruction from CPU 11, control section 27 determines that memory block 23-i must be accessed, and notifies memory I/F 24-i of a read access. Control section 27 notifies operation circuit 25-1 of the read access, and values of "p" and "q", and the like, and further notifies bus I/F 26-1 of the write access.

Bus I/F 26-1 receives 8 bits data from image bus 13-1, and outputs it to operation circuit 25-1.

(2) Operation circuit 25-1 shifts, by p bits, the input data toward the MSB, and outputs the data to memory I/F 24-i.

(3) Memory I/F 24-1 renders chip select signals Cp to Cp+q−1 active, and writes the q bits following bit "p" of the 8-bit data output from operation circuit 25-1, into the corresponding memory area of memory block 23-i.

For example, when p=2 and q=4, and data "10101010" is output to image bus 13-1, operation circuit 24-1 outputs data "10101000". Memory I/F 24-1 renders chip select signals C2 to C5 active, and writes data "1010" into memory chips 30-2 to 30-5.

D: Write Operation for Two Memory Blocks

The data is written into "q" bits ($1 \leq q \leq 8$) as counted from bit "p" ($1 \leq p \leq 7$) of memory block 23-i is written. Here, p+q=8. (8-p)- bit is written into memory block 23-i, and (p+q−8) bit is written into the next memory block 23-(i+1).

(1) Upon receipt of an instruction from CPU 11, control section 27 determines that memory blocks 23-i and 23-(i+1) must be accessed, and notifies memory I/Fs 24-i and 24-(i+1) of a read access. Control unit 27 notifies operation circuit 24-1 of the read access, and values of "p" and "q", and the like, and further notifies bus I/F 25-1 of the write access.

Bus I/F 26-1 receives 8 bits data through image bus 13-1, and outputs it to operation circuit 25-1.

(2) Operation circuit 25-1 shifts, by p bits, the input data toward the MSB, and outputs the 8-bit data to memory I/F 24-i. The same also shifts, by (8−p) bits, the input data toward the LSB, and outputs the 8-bit data to memory I/F 24-(i+1).

(3) Memory I/F 24-i renders chip select signals Cp to C7 active, and writes the (8-q) bits following bit "p" of the 8-bit data output from operation circuit 25-1, into the corresponding memory area of memory block 23-i. Memory I/F 24-(i+1) renders chip select signals Co to Cp+q−8 active, and writes the (p+q−8) bits following bit "0" of the 8-bit data output from operation circuit 25-1, into the corresponding memory area of memory block 23-(i+1).

For example, when p=6 and q=4, and data "10101010" is output to image bus 13-1, operation circuit 25-1 outputs data "10000000" to memory I/F 24-i, and outputs data "00000010" to memory I/F 24-(i+1). Memory I/F 24-i renders chip select signals C6 and C7 active, and writes data "10" into memory chips 30-6 and 30-7 Memory I/F 24-(i+1) renders chip select signals C0 and C1 active, and writes data "10" into memory chips 30-1 and 30-2.

Figure 3:
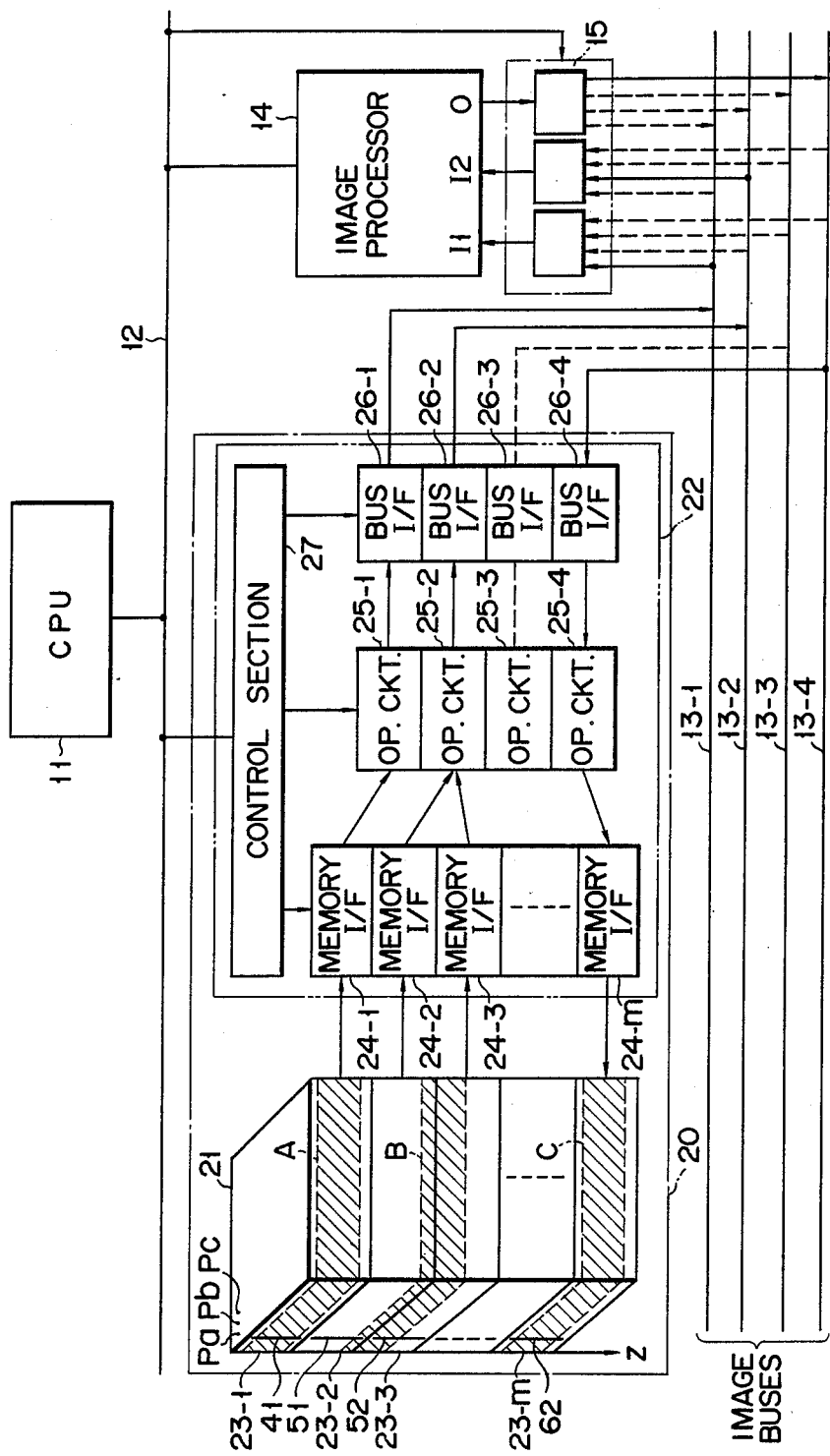
FIG. 3 shows a block diagram useful in explaining the operation of the image processing apparatus of FIG. 1.

The operation of the image processing apparatus according to this embodiment will now be described, with reference to FIGS. 3 to 4C. The image data of the stored in memory areas A and B of 3-dimensional frame memory 21 are ANDed, thus generating new image data. The new image data is stored into memory area C of 3-dimensional frame memory 21.

Memory area A is defined by bit 1 to bit 6 of memory block 23-1 and located in the Z direction. Memory area B is defined by bit 6 of memory block 23-2 to bit 3 of memory block 23-3 and arranged in the Z direction. Memory area C is defined by bit 1 to bit 6 of memory block 23-m and arranged in the Z direction. Image bus 13-1 is used for the destination bus of the image data from memory area A. Image bus 13-2 is used for the destination bus of the image data from memory area B. Image bus 13-4 is used for the destination bus of the image data from memory area C. Image buses 13-1 and 13-2 are allocated to ports 11 and 12 of image processor 14, and image bus 13-4 are allocated to port 0.

CPU 11 outputs, to control section 27, an instruction representing the type of an operation to be performed, and an instruction showing how buses 13-1 to 13-4 must be allocated to areas A to C.

CPU 11 directs image processor 14 to perform the AND operation, to drive image processor 14.

In response to the instruction from CPU 11, control section 27 makes memory I/Fs 24-1 to 24-3 ready for the read operation and memory I/F 24-m to prepare for write operation. Control section 27 instructs operation circuit 25-1 to logically operate the data from memory I/F 24-1, and instructs operation circuit 25-2 to operate the data from memory I/Fs 24-2 and 24-3. It further instructs operation circuit 25-4 to operate the data from bus I/F 26-4. Section 27 then supplies the necessary data to those circuits. Additionally, control section 27 sets I/Fs 26-1 and 26-2 in a read mode, and bus I/F 26-4 in a write mode.

Upon the above settings, the read processing (in this case, p=1 and q=6) of A as stated is applied to memory area A; the read processing (p=6 and q=6) of B as stated above is applied to memory area B; the write processing (p=1 and q=6) of C as stated above is applied to memory area C. The processings for these memory areas will be described.

The processing for memory area A will first be described. Memory I/F 24-1 outputs the address of first pixel Pa, sets a R/W signal in a write enable state, and sets all of the chip select signals C0 to C7 at an active level, and reads out data 41 showing the first pixel from memory block 23-1. This 8-bit data 41 is supplied to operation circuit 25-1. This circuit 25-1 shifts data 41 by 1 (=p) bit toward LSB, as is shown in FIG. 4A, and sets "0" in the bits equal to or higher than 6 (=q). The circuit outputs data 42 to bus I/F 26-1, which in turn outputs data 42 to bus 13-1. Data 42 is supplied through image bus controller 15 to the input port 11 of image processor 14.

The processing for memory area B follows. Memory I/Fs 24-2 and 24-3 read out data 51 and 52 from memory blocks 23-2 and 23-3, respectively, and output them to operation circuit 25-2. This circuit 25-2 shifts data 51 by 6 (=q) bits toward LSB, sets "0" in the bits equal to or higher than bit 2 (=8−p), thus forming data 53. Likewise, operation circuit 25-2 shifts data 52 read out by memory I/F 24-3, by 2 bits, toward MSB, and sets "0" in the bits equal to or higher than bit 1 (=7−p), and in the bits equal to or higher than bit 6 (=q), thus forming data 54. Operation circuit 25-2 logically sums data 52 and 53, thereby forming data 55, and outputs this data to bus I/F 26-2, which in turn outputs it to image bus 13-2. Data 55 is supplied to the input port 12 of image processor 14 via image bus controller 15.

Figure 4C:
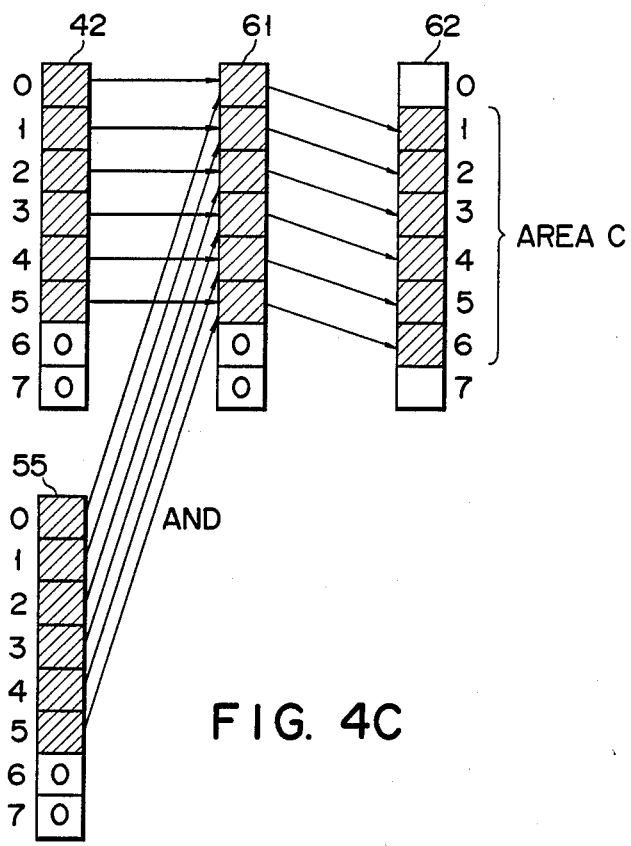
FIGS. 4A to 4C show diagrams useful in explaining the processing of image data by the image processor of FIG. 1.
Figure 4A:
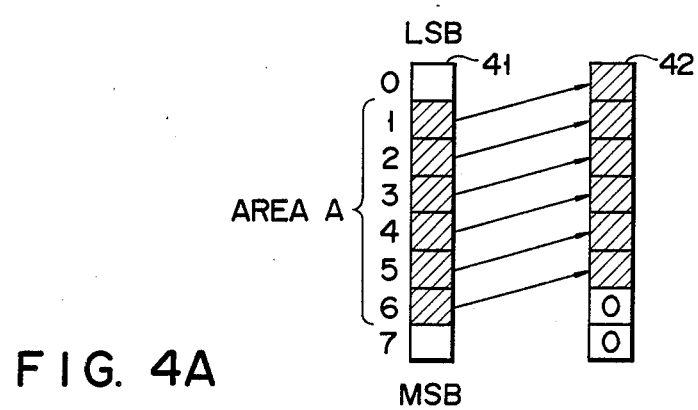
Figure 4B:
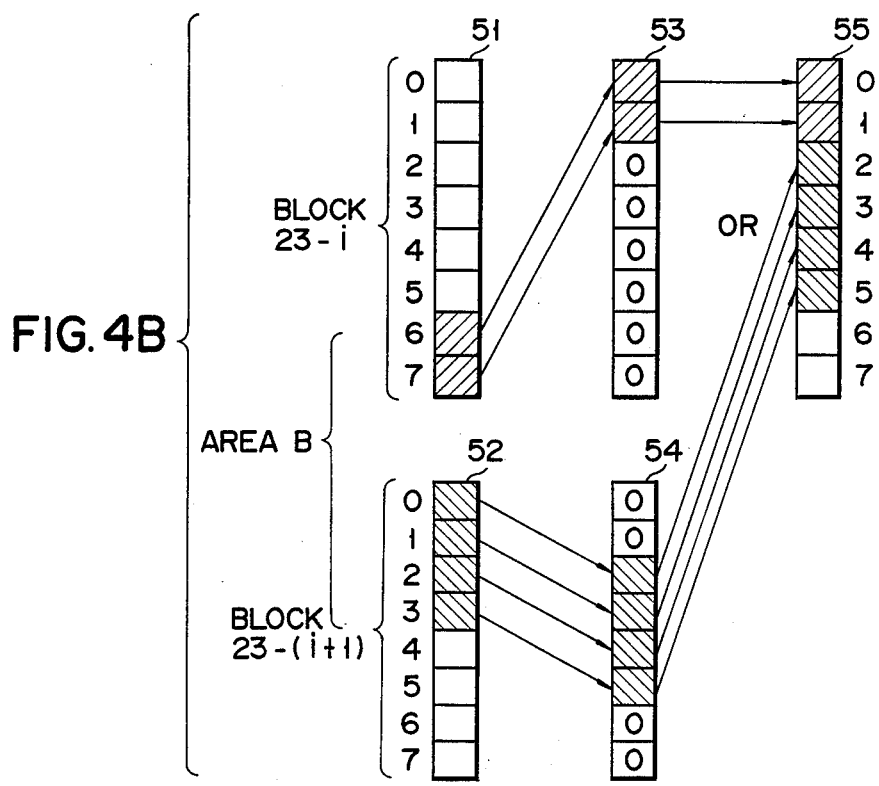

Image processor 14 ANDs 8-bit data 42 and 55 supplied to input ports 11 and 12, as is shown in FIG. 4C. Data 61, a logical product, is supplied through output terminal 0 to image bus controller 15. Image bus controller 15 outputs data 61 to image bus 13-4.

The processing for memory area C follows. Bus I/F 26-4 receives data 61 from image bus 13-4 and outputs it to operation circuit 25-4. This circuit 26-4 shifts data 61 by 1 (=p) bit toward MSB, thus forming data 62 including the data (bit 1 to bit 6) to be stored into memory area C. Operation circuit 25-4 outputs the data to memory I/F 24-m. Memory I/F 24-m renders a R/W signal write-enable, chip select signals C1 to C6 active, and chip select signals C0 and C7 nonactive. It outputs the address of first pixel Pa, and finally writes 6 bits (bit 1 to bit 6) of data 62 from operation circuit 25-4, into memory area C. In this embodiment, no write operation is performed for the memory chips 30-0 and 30-7 of memory block 23-m, which provide a memory area outside memory area C. Therefore, the data stored in memory chips 30-0 and 30-7 are protected.

When memory I/F 24-m is writing data 62 into area C, memory I/Fs 24-1 to 24-3 read data for second pixel Pb from memory blocks 23-1 to 23-3. Subsequently, the above operation is continued in a pipeline manner, read→write and read→write and read→... write. The image data of all of the pixels stored in memory areas A and B are ANDed and then stored into memory area C. Then, CPU 11 removes allocation of image buses to memory controller 22 and image bus controller 15.

The embodiment described above is an apparatus for processing 6-bit image data. Nonetheless, this invention is applicable to an apparatus for processing image data consisting of any other number of bits, which falls within the data length of image buses 13-1 to 13-4. The bit length of the read data is not necessarily equal to that of the write data. This invention is applicable for a case that data 61, which is the logical sum of 6-bit image data 42 and 55, is expressed in two levels with reference to a threshold value, and the data obtained (1 bit) is stored into frame memory 21.

Although the gray level data is processed as the image data in the above-mentioned embodiment, this invention can be applied for processing any other data stored in the 3-dimensional memory. Further, the image data stored in 3-dimensional frame memory 21 is not limited to the 2-dimensional image of two level or multi-level. The 3-dimensional two level image data such as logical operations, e.g., AND and OR, and peripheral distribution, and logical filtering, can be processed by 2-dimensional image processor 14 in a similar manner to that of the two-dimensional image processing. In the embodiment described above, pixels are sequentially processed in the order from first pixel Pa, second pixel Pb, ... These pixels may be processed in an appropriate order.

It is noted that the number of bits of the image data is not fixed, but selected appropriately. Therefore, the memory space of 3-dimensional frame memory 21 may be divided into a proper number of blocks of proper bits, in the depth (Z) direction. This indicates that the memory space may effectively be utilized, and more image data can be stored in the image memory than that in the case where the number of bits of the image data is fixed. Furthermore, when two-level 3-dimensional image is stored into the frame memory, the 3-dimensional image data can be processed by using the image processor for the two-dimensional image data.

What is claimed is:

1. An image processing apparatus comprising:
three-dimensional frame memory means for storing image data, and comprising a plurality of memory planes logically stacked in the depth direction;
memory control means, connected to said frame memory means, for independently accessing a plurality of desired memory areas of said frame memory means, each of said desired memory areas located in any desired position in the depth direction of said frame memory means and having a desired number of bits in the depth direction;
a plurality of image bus means, connected to said memory control means, for transferring image data;
image processor means, connected to said plurality of image bus means, for receiving the image data from at least one of said plurality of image bus means and performing logical operations on the image data nd for outputting the result of the performed operations to at least one of the other plurality of image bus means; and
control means connected to said memory control means and said image processor means, said control means designating access areas of said frame memory means which are to be accessed by said memory control means and the type of access to be performed in respect of each access area, and said control means allocating said plurality of image bus means to said memory control means and said image processor means for each access area.

2. An image processing apparatus comprising:
three-dimensional frame memory means for storing image data, and comprising a plurality of memory planes logically stacked in the depth direction;
memory control means, connected to said frame memory means, for independently accessing a plurality of desired memory area of said frame memory means, each of said desired memory areas located in any desired position in the depth direction of said frame memory means and having a desired number of bits;

a plurality of image bus means, connected to said memory control means, for transferring image data;

image processor means, connected to said plurality of image bus means, for receiving the image data from at least one of said plurality of image bus means and performing logical operations on the image data and for outputting the result of the performed logical operations to at least one of the other plurality of image bus means;

control means connected to said memory control means and said image processor means, said control means designating access areas of said frame memory means which are to be accessed by said memory control means and the type of access to be performed in respect of each access area, and said control means allocating said plurality of image bus means to said memory control means and said image processor means for each access area; and wherein said memory control means includes, when in a read mode, data conversion means for converting the data read out from said access areas into data to be transferred through said image bus means, and, when in a write mode, data conversion means for converting the data supplied from said image bus means into data to be written into said access areas.

3. The image processing apparatus according to claim 2, wherein said frame memory means is divided, in a depth direction, into a plurality of memory blocks each having a depth defined by r bits equal to a bit length of said image bus means, said memory control means reads out r bits from one memory block containing one access area, when said one access area is located in said one memory block and the image data is read out from said one access area, said data conversion means extracts, from the read out data, the image data stored in said one access area, converts it into data the number of bits of which is equal to the bit length of said image bus means, and outputs it to said image bus means.

4. The image processing apparatus according to claim 3, wherein said one access area is an area of q bits ($1 \leq q \leq r$) as counted from bit p ($0 \leq p \leq r-1$) of said one memory block, where $1 \leq p+q \leq r$, said memory control means reads the r-bit data from said one memory block, and said data conversion means shifts the read out data by p bit toward LSB, and sets "0" in each of the bits equal to or higher than bit q+1 of the shifted data.

5. The image processor according to claim 2, wherein said frame memory means is divided, in a depth direction, into a plurality of memory blocks each having a depth defined by r bits equal to a bit length of said image bus means, said memory control means reads out r bits from at least two memory blocks part of each of which constitutes one access area, when said one access area is located in said two memory blocks and the image data is read out from said one access area, said data conversion means extracts, from the read out data, the image data stored in said one access area, converts it into data the number of bits of which is equal to the bit length of said image bus means, and outputs it to said image bus means.

6. The image processing apparatus according to claim 5, wherein said one access area is an area of q bits ($1 \leq q \leq r$) as counted from bit p ($1 \leq p \leq r-1$) of an i-th memory block, where $p+q=>r$, said memory control means reads the r-bit data from the i-th memory block and an (i+1)-th memory block, and said data conversion means shifts the data read out from said i-th memory block by p bits toward a least significant bit (LSB), and sets "0" in each of the bits equal to or higher than bit (r−p) of the shifted data, to form first data, and shifts the data read out from said (i+1)-th memory block by p bits toward a most significant bit (MSB), and sets "0" in each of the bits equal to or lower than bit (r-1-p) p) and each of the bits equal to or higher than bit q, to form second data, and then logically sums said first data and second data.

7. The image processing apparatus according to claim 2, wherein said frame memory means is divided, in a depth direction, into a plurality of memory blocks each having a depth defined by r bits equal to a bit length of said image bus means, said memory control means supplies the output data of said data conversion means to one memory block, and places at least one of said memory planes constituting one access area in a writeenable state, and writes the data into said one access area, when said one access area is located in said one memory block and the image data is written into said one access area.

8. The image processing apparatus according to claim 7, wherein said one access area is an area of q bits ($1 \leq q \leq r$) as counted from bit p ($0 \leq p \leq r-1$) of said i-th memory block, where $p+q \leq r$, said data conversion means shifts input data from said image bus means by p bits toward an MSB, said memory control means supplies the shifted data to said i-th memory block and places the memory planes constituting said one access area in a write-enable state, and writes "q" bits as counted from bit p of the r-bit data output from said data converting means, into said one access area.

9. The image processor according to claim 2, wherein said frame memory means is divided, in a depth direction, into a plurality of memory blocks each having a depth defined by r bits equal to a bit length of said image bus means, said memory control means supplies the output data of said data conversion means to at least two memory blocks, and places the memory planes constituting one access area in a write-enable state, and writes the data into said one access area, when said one access area is located over said two memory blocks and the image data is written into said one access area.

10. The image processing apparatus according to claim 9, in which said one access area is an area of "q" bits ($1 \leq q \leq r$) as counted from bit "p" ($1 \leq p \leq r-1$), of an i-th memory block, where $P+q > r$, said data conversion means receives data from said image bus means, shifts the received data by p bits toward an MSB, and supplies the shifted data to said i-th memory block, and shifts the received data by (r-p) bits toward a LSB, and supplies the shifted data to an (i+1)-th memory block, said memory control means places said p-th to (r−1)-th memory planes constituting said i-th memory block in a write-enable state, writes the (r-p) bits of the supplied data into said i-th memory block, and places said 0−th to (p+q−r−1)-th memory planes of said (i+1)−th memory block in a write-enable state, and writes (p+q−r) bits of the supplied data into said (i+1)-th memory block.

11. The image processor according to claim 2, wherein said frame memory means is divided, in a depth direction, into a plurality of memory blocks each having a depth defined by r bits equal to a bit length of said image bus means, said memory control means includes:

memory interface means provided for each memory block and each of which accesses a corresponding one of said memory blocks, operation means provided for each image bus means, each of said operation means connected to said memory interfaces and interconverting the number of bits of the data stored in said access areas with that of the data on said image bus means; and bus interface means provided for each image bus means and each of which is connected to a corresponding one of said image bus means and said corresponding data conversion means, and controlling the transferring of the data between said image bus means and said data conversion means.

12. An image processing apparatus comprising:

frame memory means comprising a plurality of memory planes logically stacked in the depth direction for storing image data;

memory control means, connected to said frame memory means, for independently accessing desired memory areas of said frame memory means, each of said desired memory areas having a desired number of bits in the depth direction;

a plurality of image bus means connected to said memory control means, for transferring image data;

image processor means connected to said plurality of image bus means, said image processor means receiving the image data from at least one of said plurality of image bus means and performing logical operations on the image data and supplying the result of the performed logical operations to said memory control means via at least one of said plurality of image bus means; and control means, connected to said memory control means, for controlling said memory control means so that when said memory control means read at least one of said desired memory areas of said frame memory means, said memory control means performs a write or read operation in the other one of said desired memory areas.

* * * * *